(12) United States Patent
Miller, Jr. et al.

(10) Patent No.: US 9,873,433 B2
(45) Date of Patent: Jan. 23, 2018

(54) SYSTEM AND METHOD FOR CONTROLLING TORQUE TO A DRIVESHAFT

(71) Applicant: Bendix Commercial Vehicle Systems LLC, Elyria, OH (US)

(72) Inventors: Thomas S Miller, Jr., Lagrange, OH (US); Nathan L Moseley, Brecksville, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 15/065,101

(22) Filed: Mar. 9, 2016

(65) Prior Publication Data

US 2017/0259827 A1 Sep. 14, 2017

(51) Int. Cl.
| | |
|---|---|
| *B60T 7/12* | (2006.01) |
| *B60W 30/18* | (2012.01) |
| *F16H 63/50* | (2006.01) |
| *B60T 8/175* | (2006.01) |

(52) U.S. Cl.
CPC ....... *B60W 30/18172* (2013.01); *B60T 8/175* (2013.01); *F16H 63/50* (2013.01)

(58) Field of Classification Search
CPC ..... B60W 30/18172; B60W 2710/105; B60W 2030/18081; B60T 8/175; F16H 63/50
USPC .......................................... 701/54, 67, 83, 84
See application file for complete search history.

(56) References Cited

U.S. PATENT DOCUMENTS

| | | | |
|---|---|---|---|
| 5,333,706 A | 8/1994 | Mori | |
| 5,501,109 A | 3/1996 | Naito et al. | |
| 5,564,796 A | 10/1996 | Saito et al. | |
| 5,573,315 A | 11/1996 | Schmitt et al. | |
| 6,282,481 B1 | 8/2001 | Hosomi | |
| 6,616,250 B1 | 9/2003 | Fennel et al. | |
| 7,197,383 B2 | 3/2007 | Tobler et al. | |
| 7,236,871 B2 | 6/2007 | Sah et al. | |
| 7,758,468 B2 | 7/2010 | Vafidis et al. | |
| 8,180,547 B2 | 5/2012 | Prasad et al. | |
| 8,626,417 B2 | 1/2014 | Oral | |
| 2006/0004507 A1* | 1/2006 | Teslak | B60K 6/12 701/69 |
| 2007/0294017 A1* | 12/2007 | Joshi | F16D 48/06 701/67 |
| 2008/0236911 A1 | 10/2008 | Yamamoto et al. | |
| 2015/0051046 A1 | 2/2015 | Wise et al. | |

FOREIGN PATENT DOCUMENTS

| | | |
|---|---|---|
| EP | 2080682 A2 | 7/2009 |
| EP | 1978278 B1 | 6/2011 |
| EP | 2578461 A1 | 4/2013 |

(Continued)

*Primary Examiner* — Gertrude Arthur Jeanglaude
(74) *Attorney, Agent, or Firm* — Brian E. Kondas; Cheryl L. Greenly; Eugene E. Clair

(57) ABSTRACT

A controller comprises a memory, including a maximum rated driveshaft torque for a driveshaft on a vehicle, and an electrical output transmitting an output signal for limiting a torque on the driveshaft of the vehicle during an event while the vehicle is attempting to at least one of maintain and increase velocity. The torque on the driveshaft is limited by controlling braking pressure to at least one brake associated with driven wheels and/or controlling motor torque delivered to the driveshaft.

26 Claims, 2 Drawing Sheets

(56) References Cited

FOREIGN PATENT DOCUMENTS

| | | |
|---|---|---|
| EP | 2374673 B1 | 8/2013 |
| EP | 2783937 A2 | 10/2014 |
| GB | 2504834 B | 5/2015 |
| JP | 2008020354 A | 1/2008 |
| WO | 2014037541 A1 | 3/2014 |
| WO | 2014037542 A1 | 3/2014 |

* cited by examiner

SYSTEM AND METHOD FOR CONTROLLING TORQUE TO A DRIVESHAFT

BACKGROUND

The present invention relates to controlling torque delivered to a vehicle driveshaft. It finds particular application in conjunction with limiting the torque delivered to the driveshaft and will be described with particular reference thereto. It will be appreciated, however, that the invention is also amenable to other applications.

A vehicle powertrain includes the components of the vehicle that generate power and deliver it to the road surface. For example, a vehicle powertrain includes the motor, transmission, driveshaft, differential, and the final drive components (e.g., drive axles and drive wheels). A vehicle driveline (e.g., drivetrain) includes parts of a vehicle powertrain after the transmission. Evolution of heavy vehicle powertrains has resulted in higher torque forces applied to the drivelines and, more specifically, to the driveshafts between the transmission and drive axles. Therefore, torque applied to the driveshaft may be high enough to damage (e.g., break) the driveshaft.

For example, automatic traction control (ATC) may apply high levels of braking torque to some of the drive wheels, when necessary, to assist in accelerating the vehicle. This level of traction control braking torque, when resisting the torque from the driveshaft through the gearing of the differential, may be enough to damage (e.g., break) the driveshaft. In another example, manual acceleration by a vehicle operator depressing an acceleration pedal may similarly result in a level of torque applied to the driveshaft that may damage (e.g., break) the driveshaft.

The present invention provides a new and improved apparatus and method for reducing damage (e.g., breakage) to a vehicle driveshaft.

SUMMARY

In one aspect of the present invention, it is contemplated that a controller comprises a memory, including a maximum rated driveshaft torque for a driveshaft on a vehicle, and an electrical output transmitting an output signal for limiting a torque on the driveshaft of the vehicle during an event while the vehicle is attempting to at least one of maintain and increase velocity.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
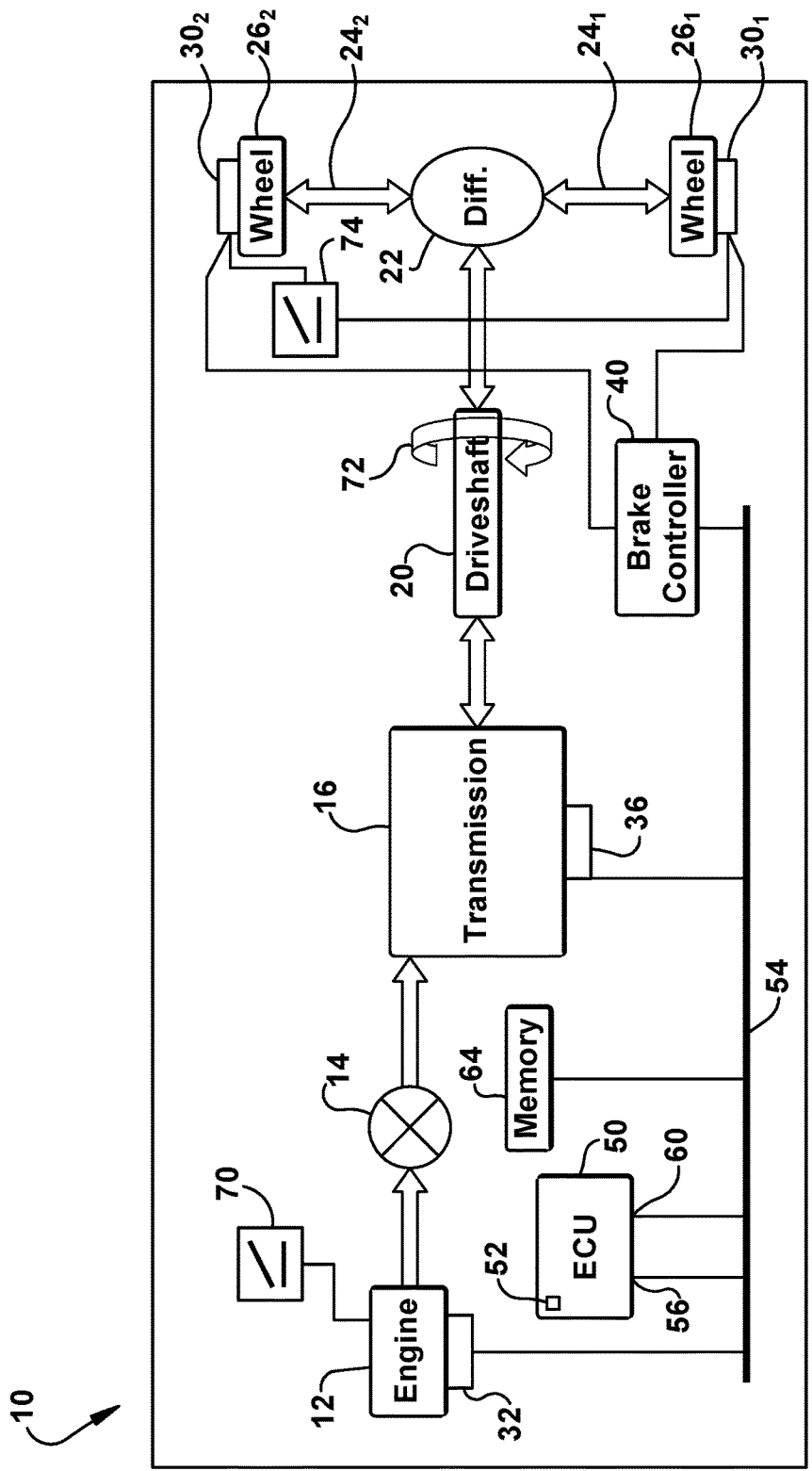
FIG. 1 illustrates a schematic representation of a vehicle in accordance with one embodiment of an apparatus illustrating principles of the present invention.

With reference to FIG. 1, a simplified component diagram of an exemplary vehicle 10 is illustrated in accordance with one embodiment of the present invention. The vehicle 10 includes an motor 12, a clutch 14, a transmission 16, a driveshaft 20, at least one differential 22, at least two (2) axles $24_1$, $24_2$ (collectively, 24), and at least two (2) wheels $26_1$, $26_2$ (collectively, 26) that are mechanically driven by the motor 12, the clutch 14 and the transmission 16 via the driveshaft 20, the differential 22, and the axles 24. In one embodiment, it is contemplated that the wheel $26_1$ is a driver side wheel and the wheel $26_2$ is a passenger side wheel. Similarly, it is contemplated that the axle $24_1$ is a driver side axle and the axle $24_2$ is a passenger side axle. The driveshaft 20 transfers torque between the transmission 16 and the differential 22. The wheels 26 driven by the transmission are referred to as driven wheels. Respective brakes $30_1$, $30_2$ (collectively, 30) (e.g., service brakes) are used for braking the wheels $26_{1,2}$. Although only two (2) wheels 26 (e.g., the two (2) driven wheels 26) and brakes 30 are illustrated for purposes of discussion, it is to be understood other driven wheels and/or non-driven wheels and corresponding brakes are also included on the vehicle 10.

Although only one driveshaft 20 between the transmission 16 and the differential 22 is illustrated for ease of description, it is to be understood that vehicle 10 may include any number of driveshafts for driving different components on the vehicle 10. The system and method described herein for controlling (e.g., limiting) torque delivered to the driveshaft 20 may also be used for controlling (e.g., limiting) torque delivered to any of the driveshafts on the vehicle 10.

A motor controller 32 is electrically connected to the motor 12. The motor controller 32 monitors, for example, the temperature and speed (e.g., revolutions per minute (rpm's)) of the motor 12. The motor controller 32 also controls the motor 12 by, for example, controlling the speed (e.g., rpm's) of the motor 12.

In the illustrated embodiment, a transmission controller 36 is electrically connected to the transmission 16. The transmission controller 36 monitors, for example, the transmission ratio (e.g., gear) of the transmission 16. The transmission controller 36 also controls the transmission 16 by, for example, controlling transmission ratio (e.g., gear) of the transmission 16. Although the transmission ratio is described as a discrete gear of the transmission 16 (e.g., $1^{st}$ gear, $2^{nd}$ gear, $3^{rd}$ gear, etc.), other embodiments including different types of transmissions such as continuously variable transmissions (CVT's), which has a continuous range of effective gear ratios, and electric variable transmissions (EVT's) are also contemplated. Furthermore, the embodiment shown in FIG. 1 is assumed to illustrate a vehicle having an automatic transmission. However, other embodiments for vehicles with manual transmissions, which may not require a transmission controller, are also contemplated.

A brake controller 40 is electrically connected to the respective brakes $30_{1,2}$. The brake controller 40 controls applications of the respective brakes $30_{1,2}$ during, for example, automatic traction control braking applications (ATC).

An electronic vehicle controller 50 (e.g., an electronic control unit (ECU)) is electrically connected to each of the motor controller 32, the transmission controller 36, and the brake controller 40. The electronic vehicle controller 50 includes a computer processor 52. In the illustrated embodiment, the electronic vehicle controller 50, the motor controller 32, the transmission controller 36, and the brake controller 40 are electrically connected to each other via a vehicle communication bus 54. In this embodiment, the electronic vehicle controller 50, the motor controller 32, the transmission controller 36, and the brake controller 40 electrically communicate with each other by transmitting and receiving messages to/from the vehicle communication bus 54. In one embodiment, the messages are configured according to the J1939 standard.

In the illustrated embodiment, the vehicle communication bus 54 is a wired connection that communicates messages as electrical signals between, for example, the electronic vehicle controller 50, the motor controller 32, the transmission controller 36, and/or the brake controller 40. However, other embodiments are also contemplated in which the vehicle communication bus 54 communicates messages as other types of signals (e.g., light signals) between, for example, the electronic vehicle controller 50, the motor controller 32, the transmission controller 36, and/or the brake controller 40. In addition, it is also contemplated that the vehicle communication bus 54 is a wireless connection between, for example, the electronic vehicle controller 50, the motor controller 32, the transmission controller 36, and/or the brake controller 40. A wireless vehicle communication bus 54 is contemplated to communicates messages as radio frequency (RF) signals between, for example, the electronic vehicle controller 50, the motor controller 32, the transmission controller 36, and/or the brake controller 40, in which case at least one of the electronic vehicle controller 50, the motor controller 32, the transmission controller 36, and the brake controller 40 includes an RF receiver and an RF transmitter.

Although the computer processor 52 is illustrated as part of the electronic vehicle controller 50, other embodiments are also contemplated in which the computer processor 52 is part of the brake controller 40, any other controller (e.g., the motor controller 32 or the transmission controller 36) and/or multiple controllers on the vehicle 10, or even a separate and discrete component.

The electronic vehicle controller 50 includes an electrical input port 56 that receives a signal from the communication bus 54, and an electrical output port 60 that transmits a signal to the communication bus 54. Although the electronic vehicle controller 50 is illustrated as having both the electrical input and output ports 56, 60, respectively, it is also contemplated that the electronic vehicle controller 50 has only a single electrical port operating as both the electrical input and the electrical output. In other embodiments with a wireless vehicle communication bus 54, the electronic vehicle controller 50, the motor controller 32, the transmission controller 36, and/or the brake controller 40, each includes respective RF receivers and RF transmitters or a combined RF receiver/transmitter.

A memory 64 also electrically communicates with the vehicle communication bus 54. In the illustrated embodiment, the memory 64 is included as a discrete component that is separate and distinct from the electronic vehicle controller 50, the motor controller 32, the transmission controller 36, and/or the brake controller 40. It is contemplated that the memory communicates with at least the brake controller 40 by transmitting messages to/from the vehicle communication bus 54. However, other embodiments, in which the memory 64 is integrated with the brake controller 40 are also contemplated.

Torque may be applied to the driveshaft 20 during an event when the vehicle is accelerated and/or decelerated. For example, when an operator of the vehicle 10 depresses an acceleration pedal 70, a torque of the motor 12 increases and the clutch 14 is engaged which, in turn, causes the transmission 16 to apply torque to the driveshaft 20 for causing the driveshaft 20 to rotate (as indicated by arrow 72). The rotating driveshaft 20 causes gears in the differential 22 to rotate, thereby causing the wheels 26 to rotate. If the driveshaft 20 is already rotating and the operator of the vehicle 10 depresses a service brake pedal 74 to apply the service brakes, the wheels 26 are slowed which, in turn, applies an opposing torque to the driveshaft 20. In the illustrated embodiment, the vehicle 10 is a conventional vehicle in which torque and/or acceleration is requested when the operator depresses the acceleration pedal 70 and torque and/or deceleration is requested when the operator depresses the service brake pedal 74. Alternatively, in other embodiments in which the vehicle 10 is an autonomous vehicle, acceleration, deceleration and/or corresponding torque is requested by an electronic controller (e.g., an autonomous vehicle controller).

Although depressing the acceleration pedal 70 and the service brake pedal 74 are events during which manual actions taken by the operator of the vehicle 10 may result in application of torque to the driveshaft 20, automatic actions taken by vehicle systems during other events may also result in application of torque to the driveshaft 20. For example, different vehicle systems that may automatically cause torque to be applied to the driveshaft 20 include an ATC system, an antilock braking system (ABS), an electronic stability program (ESP) system, a hill start assist (HSA) system, an adaptive cruise control (ACC) system (e.g., Bendix Commercial Vehicle System LLC's Wingman system), a collision mitigation system (e.g., Bendix Commercial Vehicle System LLC's Wingman Advanced system), etc. Some of these vehicle systems (e.g., the ABS and ESP system) are designed to slow a moving vehicle (e.g., reduce a velocity of the vehicle) and/or increase stability and control of the vehicle to facilitate collision avoidance and/or mitigate accidents during an event. Other vehicle systems (e.g., the ATC system) are designed to facilitate a stopped or slowly moving vehicle increase velocity during an event (e.g., a traction control event).

While manual braking and vehicle systems designed to slow a moving vehicle (e.g., reduce a velocity of the vehicle) and/or increase stability and control of the vehicle increase vehicle safety during an event (e.g., an ABS event), fast acceleration by depressing the acceleration pedal 70 and the other vehicle systems designed to facilitate increasing a vehicle's velocity during an event (e.g., during an ATC event) may be viewed more for convenience of the vehicle operator rather than vehicle safety. Systems that increase vehicle safety may be viewed as relatively more critical than other vehicle systems that simply offer a convenience to the vehicle operator. Therefore, in one embodiment, it is desirable to not limit the torque applied to the driveshaft 20 if it would reduce vehicle safety (e.g., during events that it is desirable to reduce the velocity of the vehicle 10). Said differently, it is only desirable to limit the torque applied to the driveshaft 20 if vehicle safety is not compromised (e.g., during events that it is desirable to increase the velocity of the vehicle 10).

The driveshaft 20 is rated by, for example, the manufacturer for a maximum torque. The maximum torque is a torque value below which the driveshaft 20 is rated to not be damaged and/or break. Therefore, it is desirable to reduce a number of events (e.g., a number of events that do not compromise vehicle safety) resulting in a torque value on the driveshaft 20 that is above the maximum torque value.

Figure 2:
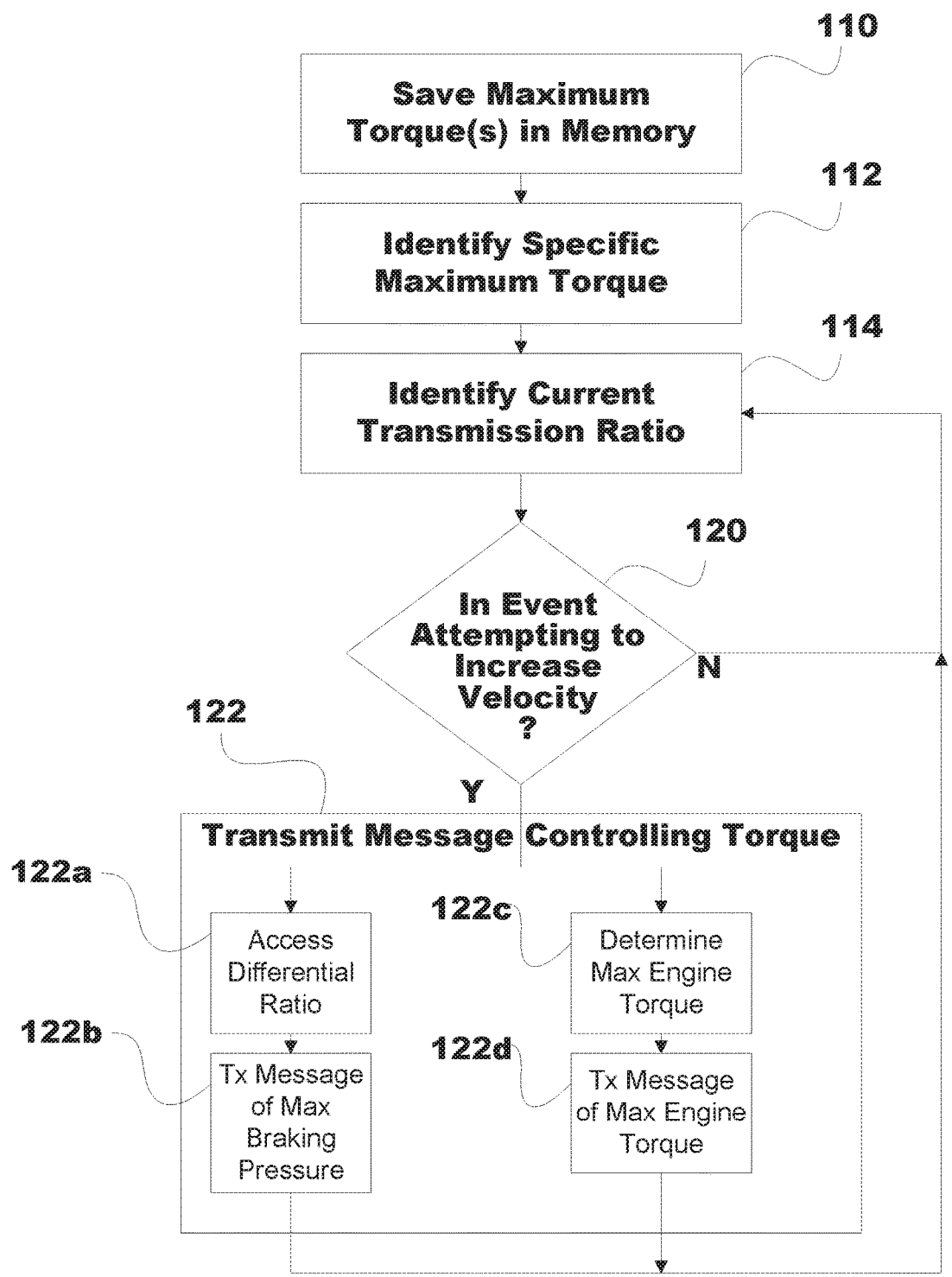
FIG. 2 is an exemplary methodology of controlling torque to the driveshaft in accordance with one embodiment illustrating principles of the present invention.

With reference to FIG. 2, an exemplary methodology of the system shown in FIG. 1 for controlling a torque to the driveshaft 20 during an event when the vehicle 10 is attempting to at least one of maintain and increase (e.g., maintain/increase) velocity is illustrated. As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

The maximum torque for the driveshaft 20 is saved in the memory 64 in a step 110. In one embodiment, only the maximum torque for the driveshaft 20 of the vehicle 10 (e.g., the current vehicle) is saved in the memory 64. However, in other embodiments, maximum torques for a plurality of different driveshafts are saved in the memory in the step 110. Although the step 110 is described as currently saving the maximum torque(s) for the driveshaft(s) 20 in the memory 64, other embodiments in which the maximum torque(s) for the driveshaft(s) 20 are previously saved in the memory 64 are also contemplated. In the embodiments discussed above, the memory 64 acts as a look-up table. Then, in a step 112, the specific maximum torque for the particular driveshaft 20 of the vehicle 10 (e.g., the current vehicle) is identified.

In a step 114, the brake controller 40 identifies a current transmission ratio (e.g., gear) as either a calculated value (e.g., calculated based on a current output speed of the engine (e.g., motor 12) and current speeds of the respective wheels 26) or a message received by the brake controller 40 from, for example, the electronic vehicle controller 50 via the communication bus 54.

In a step 120, the vehicle controller 50 determines if the vehicle 10 is in an event during which the vehicle 10 is attempting to maintain/increase velocity. If it is determined in the step 120 that the vehicle 10 is not in an event during which the vehicle 10 is attempting to maintain/increase velocity, control returns to the step 114. Otherwise, if it is determined in the step 120 that the vehicle 10 is in an event during which the vehicle 10 is attempting to maintain/increase velocity, control passes to a step 122.

In the step 122, the vehicle controller 50 transmits a message to the communication bus 54 via the output port 60 for controlling (e.g., limiting) a torque on the driveshaft 20 during the event.

In one embodiment, the step 122 includes transmitting the message to the brake controller 40, via the communication bus 54, for controlling (e.g., limiting) the torque on the driveshaft 20 during the event by controlling (e.g., limiting) braking pressure on at least one of the driven wheels 26. In this embodiment, in a step 122a, the vehicle controller 50 accesses a differential ratio, which is previously stored in the memory 64, for the vehicle 10. The vehicle controller 50 then determines the maximum braking pressure to apply to the at least one brake 30 based on the differential ratio. For example, the maximum braking pressure to apply to the at least one brake 30 is proportional to the differential ratio. If the axle torque is 6000 N-m and the maximum driveshaft torque is 2000 N-M, the differential ratio is 3:1 (e.g., 6000 N-m/2000 N-m). Therefore, the maximum axle torque would be 6000 (e.g., the maximum driveshaft torque 2000 N-m*differential ratio 3). Then, the maximum brake pressure is 2 bar (e.g., the axle torque of 6000 N-m/brake gain 3000 N-m/bar). In another example, if the axle torque is 4000 N-m and the maximum driveshaft torque is 2000 N-M, the differential ratio is 2:1 (e.g., 4000 N-m/2000 N-m).

Therefore, the maximum axle torque would be 4000 (e.g., the maximum driveshaft torque 2000 N-m*differential ratio 2). Then, the maximum brake pressure is 1.33 bar (e.g., the axle torque of 4000 N-m/brake gain 3000 N-m/bar). From these examples, it is seen that the maximum braking pressure to apply to the at least one brake 30 during the event is proportional to the differential ratio. A message including the maximum braking pressure is transmitted from the vehicle controller 50 to the at least one braking controller 40 in a step 122b.

In another embodiment, the step 122 includes transmitting the message to the brake controller 40, via the communication bus 54, for controlling (e.g., limiting) the torque on the driveshaft 20 during the event by controlling (e.g., limiting) motor torque passed to the at least one of the driven wheels 26. Once the vehicle controller 50 receives the message including the current transmission ratio (e.g., gear), the vehicle controller 50 determines the maximum motor torque during the event based on the current transmission ratio (e.g., gear) in a step 122c. If the maximum driveshaft torque is 2000 N-m and the current transmission ratio is 20:1 (e.g., $1^{st}$ gear), the maximum motor torque determined during the step 122c is 100 N-m (e.g., the maximum driveshaft torque 2000 N-m/the current transmission ratio 20). In another example, if the maximum driveshaft torque is 2000 N-m and the current transmission ratio is 15:1 (e.g., $2^{nd}$ gear), the maximum motor torque determined during the step 122c is 133.3 N-m (e.g., the maximum motor torque 2000 N-m/the current transmission ratio 15). From these examples, it is seen that the maximum motor torque during the event is inversely proportional to the transmission ratio. A message including the maximum motor torque is transmitted from the vehicle controller 50 to the motor controller 32 in a step 122d.

After the steps 122b and 122d, control returns to the step 114.

It is to be understood that the vehicle electronic controller 50, the processor 52, the memory 64, the motor controller 32, the transmission controller 36, and/or the brake controller 40 act as a means for controlling a torque on the driveshaft 20 of the vehicle 10 to not exceed the current maximum rated driveshaft torque during an event while the vehicle 10 is attempting to maintain/increase velocity While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A controller, comprising:
    a memory including a maximum rated driveshaft torque for a driveshaft on a vehicle; and
    an electrical output transmitting an output signal for limiting a torque on the driveshaft of the vehicle to not exceed the maximum rated driveshaft torque during an event while the vehicle is attempting to one of maintain and increase velocity, the output signal including a message that is transmitted to a brake controller for limiting the torque on the driveshaft by controlling a brake pressure on a driven wheel.

2. The controller as set forth in claim 1, wherein:
the maximum rated driveshaft torque is specific for the vehicle.

3. The controller as set forth in claim 2, wherein:
the maximum rated driveshaft torque is previously programmed into the memory for the specific vehicle.

4. The controller as set forth in claim 1, wherein:
the message transmitted to the brake controller is also based on a differential ratio.

5. The controller as set forth in claim 4, wherein:
the brake pressure is proportional to the differential ratio.

6. A controller, comprising:
a memory including a maximum rated driveshaft torque for a driveshaft on a vehicle; and
an electrical output transmitting an output signal for limiting a torque on the driveshaft of the vehicle to not exceed the maximum rated driveshaft torque during an event while the vehicle is attempting to one of maintain and increase velocity, a current transmission ratio being determined as one of a plurality of transmission ratios, the output signal including a message that is transmitted to a motor controller for limiting the torque on the driveshaft by controlling a motor torque based on the current transmission ratio.

7. The controller as set forth in claim 6, wherein:
the current transmission ratio is determined by receiving an input signal, indicative of the current transmission ratio, at an electrical input.

8. The controller as set forth in claim 6, wherein:
the motor torque is inversely proportional to the transmission ratio.

9. The controller as set forth in claim 6, wherein:
the transmission ratios correspond to respective transmission gears.

10. The controller as set forth in claim 1, wherein:
the event while the vehicle is attempting to one of maintain and increase velocity is at least one of an automatic traction control event and an acceleration request.

11. A vehicle system, comprising:
respective driver and passenger side wheels;
a driver side axle mechanically driving the driver side wheel;
a passenger side axle mechanically driving the passenger side wheel;
a differential mechanically driving the driver side axle and the passenger side axle;
a transmission;
a driveshaft mechanically connected between the transmission and the differential, the driveshaft transferring torque between the transmission and the differential; and
a controller, comprising:
a memory including a maximum rated driveshaft torque for the driveshaft; and
an output transmitting an output signal for limiting a torque on the driveshaft of an associated vehicle during an event while the vehicle is attempting to one of maintain and increase velocity.

12. The vehicle system as set forth in claim 11, wherein:
the maximum rated driveshaft torque is specific for the associated vehicle.

13. The vehicle system as set forth in claim 11, further including:
a brake controller controlling application of respective brakes on the driver and passenger side wheels;
wherein the output signal includes a message that is transmitted to the brake controller for limiting the torque on the driveshaft by controlling respective brake pressures on the driver side wheel and the passenger side wheel.

14. The vehicle system as set forth in claim 13, wherein:
the message transmitted to the brake controller is also based on a differential ratio.

15. The vehicle system as set forth in claim 14, wherein:
the brake pressure is proportional to the differential ratio.

16. The vehicle system as set forth in claim 11, further including:
a motor controller controlling motor torque;
wherein,
the controller determines a current transmission ratio; and
the output signal includes a message that is transmitted to the motor controller for limiting the torque on the driveshaft by controlling the motor torque based on the current transmission ratio.

17. The vehicle system as set forth in claim 16, wherein:
the motor torque is inversely proportional to the transmission ratio.

18. A method for controlling torque on a driveshaft, the method comprising:
saving a maximum rated driveshaft torque for a driveshaft on a vehicle in a memory;
determining if the vehicle is in an event that is attempting to one of maintain and increase a velocity of the vehicle; and
if the vehicle is in the event of attempting to one of maintain and increase velocity, transmitting an output signal for limiting a torque on the driveshaft of the vehicle to not exceed the maximum rated driveshaft torque during the event by controlling a brake pressure on a driven wheel.

19. The method for controlling torque on a driveshaft as set forth in claim 18, the step of transmitting the output signal including:
transmitting the output signal to a brake controller.

20. The method for controlling torque on a driveshaft as set forth in claim 18, further including:
controlling the brake pressure as proportional to a differential ratio.

21. A method for controlling torque on a driveshaft, the method comprising:
saving a maximum rated driveshaft torque for a driveshaft on a vehicle in a memory;
determining if the vehicle is in an event that is attempting to one of maintain and increase a velocity of the vehicle;
determining a current transmission ratio; and
if the vehicle is in the event of attempting to one of maintain and increase velocity, transmitting an output signal for limiting a torque on the driveshaft of the vehicle to not exceed the maximum rated driveshaft torque during the event by limiting the torque on the driveshaft based on the current transmission ratio.

22. The method for controlling torque on a driveshaft as set forth in claim 21, the step of transmitting the output signal including:
transmitting the output signal to a motor controller.

23. The method for controlling torque on a driveshaft as set forth in claim 21, further including:
controlling the motor torque as inversely proportional to the transmission ratio.

24. The method for controlling torque on a driveshaft as set forth in claim 18, further including:
 determining the event is occurring based on at least one of an automatic traction control event and an acceleration request.

25. A controller, comprising:
 a look-up table including maximum rated driveshaft torques for a driveshaft on an associated vehicle;
 a processor accessing a current one of the maximum rated driveshaft torques from the look-up table; and
 an electrical output transmitting an output signal for controlling a torque on the driveshaft of the vehicle to not exceed the current maximum rated driveshaft torque during an event while the vehicle is attempting to one of maintain and increase velocity by controlling a brake pressure on a driven wheel of the associated vehicle.

26. A controller, comprising:
 a look-up table including maximum rated driveshaft torques for a driveshaft on an associated vehicle; and
 a processor accessing a current one of the maximum rated driveshaft torques from the look-up table and transmitting an output signal to a motor controller for controlling the torque on the driveshaft of the vehicle to not exceed the current maximum rated driveshaft torque during an event while the vehicle is attempting to one of maintain and increase velocity by controlling a motor torque of the associated vehicle based on the current transmission ratio.

\* \* \* \* \*